United States Patent [19]

Philipp

[11] Patent Number: 5,682,032
[45] Date of Patent: Oct. 28, 1997

[54] CAPACITIVELY COUPLED IDENTITY VERIFICATION AND ESCORT MEMORY APPARATUS

[76] Inventor: Harald Philipp, 651 Holiday Dr., Bldg 5, Ste. 300, Pittsburgh, Pa. 15200

[21] Appl. No.: 604,843

[22] Filed: Feb. 22, 1996

[51] Int. Cl.[6] .................... G06K 19/06; G06K 19/00
[52] U.S. Cl. ............................. 235/422; 235/487
[58] Field of Search ................. 235/492, 382, 235/382.5, 375, 441, 487; 340/825.31–825.25

[56] References Cited

U.S. PATENT DOCUMENTS

| | | | |
|---|---|---|---|
| 4,354,189 | 10/1982 | Lemelson | 340/825.31 |
| 4,695,914 | 9/1987 | Ohtsuki et al. | 235/492 X |
| 4,760,394 | 7/1988 | Takeuchi et al. | 340/825.54 |
| 4,800,543 | 1/1989 | Lyndon-James et al. | 368/10 |
| 4,845,347 | 7/1989 | McGrindle et al. | 235/380 |
| 4,876,535 | 10/1989 | Ballmer et al. | 340/825.34 |
| 5,021,778 | 6/1991 | Walton | 340/825.54 |
| 5,068,521 | 11/1991 | Yamaguchi | 235/492 |
| 5,157,247 | 10/1992 | Takahisa | 235/432 |
| 5,204,672 | 4/1993 | Brooks | 340/825.71 |
| 5,276,294 | 1/1994 | Jalbert | 187/121 |
| 5,347,263 | 9/1994 | Carroll | 340/572 |
| 5,436,441 | 7/1995 | Inoue | 235/492 X |
| 5,568,441 | 10/1996 | Sonemitzer | 235/492 X |

FOREIGN PATENT DOCUMENTS 404074290  3/1992  Japan ....................... 239/492

OTHER PUBLICATIONS

Zimmerman, T.G., "Personal Area Networks(PAN): Near-Field Intra-body Communication" Proc. 4th Ann. Wireless Symposium, Feb. 12–16, 1996, Santa Clara, California, USA.

Primary Examiner—Donald T. Hejec
Assistant Examiner—Thien Minh Le
Attorney, Agent, or Firm—David Kiewit

[57] ABSTRACT

The invention provides a control system responsive to a data-bearing record that has two electrodes configured so that one of the two is either in physical contact with, or is at least more nearly proximate, a reader plate than is the other electrode. The reader portion of the system may use a pulsed capacitive apparatus both to sense the object or user's proximity and thereafter for data communication with the escort apparatus e.g., to receive data representative of a bearer's identity. A preferred data bearing escort apparatus is powered by electrical voltage pulses generated by the reader. This preferred escort apparatus comprises a microcomputer and a non-volatile escort memory, but does not contain a battery. Moreover, because the electrodes disposed on the data-bearing record can be very thin, as well as being proscribed in lateral extent, the data-bearing record may be conveniently small.

45 Claims, 6 Drawing Sheets

CAPACITIVELY COUPLED IDENTITY VERIFICATION AND ESCORT MEMORY APPARATUS

CROSS REFERENCE TO RELATED APPLICATIONS

The present invention makes use of proximity sensing apparatus and method disclosed in the inventor's copending U.S. application Ser. No. 08/578,464, entitled "Time Domain Capacitive Field Detector" and filed on Dec. 26, 1995, the disclosure of which is herein incorporated by reference.

BACKGROUND OF THE INVENTION

Field of the Invention

The present invention relates, inter alia, to systems controlled by personal identification and data storage devices of the sort often called "electronic keys" or "smart cards". These items commonly comprise an escort memory containing identification or other data, are carried by cooperating individuals, are used for identity verification (e.g., for access to a secure area), and may be used for transaction recording.

Description of the Prior Art

Many uses have been proposed for portable identification or access-permitting devices storing an encoded identifying datum in a non-volatile escort memory, the datum read therefrom at one or more locations to which the user carries the escort memory. Moreover, for many of these uses inventors have proposed a host of configurations of the apparatus and a variety of items in which the identifying datum could be stored. A small sampling of the patent art in this area includes:

U.S. Pat. No. 4,800,543, wherein Lyndon-James et at. teach the use of a battery-powered wristwatch comprising escort memory and transmitting an identification code to a reader comprising a keypad and co-located with a point of sale terminal. Credit or debit transactions are authorized by the system of Lyndon-James et at. when a user both brings the escort memory proximate the reader and enters a personal identification number by using the keypad.

U.S. Pat. No. 4,760,394, wherein Takeuchi et at. teach a keyless entry system for an automobile in which a user-borne encoded radio transmitter sends an identifying code to an automobile-mounted receiver having an antenna disposed on one of the automobile's windows.

U.S. Pat. No. 4,354,189, wherein Lemelson teaches a switch or lock activating mechanism employing escort memory having an optical or non-contacting electrical read-out means, the memory disposed in a finger ring or user-borne card. The lock activating mechanisms taught by Lemelson embrace door locks and other means of controlling access to a secured area, secured article protection means, and means of limiting the use of a weapon to its ring-wearing owner.

Systems using bi-directional data transfer between a user-borne portion and a reader portion have become popular. For example, debit cards having a computer memory chip embedded inside allow a user to insert the card into a cooperating pay telephone, vending apparatus, and the like and to thereafter have a cost deducted for each transaction until the card is depleted. Commercially popular systems of this sort provide electrical contact fingers on both the card and reader portions of the system, and are described in the International Standards Organization's ISO 7816 standard.

Variations on the debit card design have been proposed and marketed, and include products such as Datakey Corporation's Model 350. These devices resemble mechanical keys, but have multiple electrical contacts for data transfer and power. Invariably the data is transferred serially, bit by bit, to minimize the requisite number of electrical contacts. Another similar item is the Dallas Semiconductor DS1990A, which employs only two contacts for both power and data.

Capacitive coupling has frequently been suggested as a non-contact means of reading a code from an encoded object proximate a reader. Patents in this area include:

U.S. Pat. No. 5,021,778, wherein Walton teaches a high speed reader usable for identifying an automobile bearing an encoded tag and passing over a triad of electrodes embedded in a roadway. An alternating electric voltage applied to Walton's embedded electrodes induces a voltage in identifier circuits in the tag. During the interval in which the tag is powered, a unique tag identifier datum is read from a non-volatile memory in the tag and a signal representative of the identifier datum is transmitted to the reader.

U.S. Pat. No. 5,276,294, wherein Jalbert teaches a manually switched, battery powered capacitive key identifying a privileged user of an elevator system employing a well-known proximity call button that senses a change in capacitance to ground when a user holds his or her finger proximate the button. In the system of Jalbert's invention, when an energized key is brought near a call button circuits in the key receive a fixed frequency pulse train from the call button, add a modulation at a higher frequency, and link the higher frequency signal, which is unique to one of a small group of privileged users, back to the call button circuitry. A current loop from the capacitive call button through the user to ground, and back to the control circuitry is implicit in Jalbert's system.

U.S. Pat. No. 4,876,535, wherein Ballmer et al. teach apparatus for non-contacting information transfer between a data carrier and a data reader. At least two electrodes, or plates, on or very near the surface of the carrier are brought proximate two electrodes in the reader to provide a capacitively coupled circuit common to the reader and carrier whereby data may be transferred from either one to the other.

Transponding tag systems employing inductive coupling are also well known and are conventionally used in systems having an active, powered, identifier apparatus inductively coupled to a transponding tag. In many such systems the tag is passive and the identifier apparatus both powers and communicates with the tag. Representative of such systems is one taught by Carroll in U.S. Pat. No. 5,347,263.

Identity verification systems requiring physical contact between the authorized user and a tag, key, or other escort memory bearing article are also known in the art and are represented by the teaching of Brooks in U.S. Pat. No. 5,204,672. In Brooks' system a battery powered escort transmitter, which is always turned on, generates an RF identifying signal. The user's body, which engages the escort data carrier, serves as one pole of the transmitter antenna, the other pole being provided by the escort circuitry. Brooks provides teaching only of a "dumb beacon" simplex system. The energy cost of operating an always-on receiver in the frequency region dictated by Brooks' antenna configuration indicates that modifying Brooks' arrangement to incorporate two-way communication would be impractical.

These examples of current technology still leave room for improvement in several areas. For example, magnetic and bi-directional RF-based technologies require the generation of substantial fields by the reader portion of the system The power consumption of a continuously running reader is incompatible with battery operation. This has commonly led to the design of hybrid systems incorporating a low power consumption sensor to determine when the energetically-expensive field is to be turned on for a short interval. Contact based key-and-lock systems avoid this power consumption problem, but have other limitations: card slots and contacts are prone to contamination, vandalism, and wear; the requisite precise mating of the cooperating contact surfaces makes operation of contact systems less convenient than contactless ones; and both the card and the reader portions of the system are constrained to have a fixed contact geometry, which limits an OEM system manufacturer's freedom to change the shape of one or the other of these elements.

SUMMARY OF THE INVENTION

The invention provides a control system responsive to a data-bearing record having two electrodes disposed thereon in a manner so that one of the two electrodes is either in physical contact with, or is more nearly proximate, a reader plate than is the other electrode. The reader portion of the system may use a pulsed capacitive apparatus both to sense the object or user's proximity and thereafter to communicate with the escort apparatus e.g., to receive a datum therefrom. In a preferred embodiment of the system, electrical voltage pulses generated by the reader apparatus electrically power the data bearing record, which comprises a microcomputer and a nonvolatile escort memory, but which preferably does not contain a battery. Moreover, because the electrodes disposed on the data-bearing record can be very thin, as well as being proscribed in lateral extent, the data-bearing record may be conveniently small.

It is an object of the invention to provide an escort apparatus carried by a user, the apparatus comprising: a first electrode either in physical contact with the user or separated from the user by a dielectric having a first thickness; a second electrode isolated from the user by an intervening dielectric body having a thickness greater than the first thickness; a microprocessor; a non-volatile memory containing a datum representative of the user's identity; and communication means controlled by the microprocessor to communicate the datum to a reader. It is an additional object of the invention to provide such a system wherein the user-borne apparatus has the further capability of receiving a second datum from the reader and storing the second datum in the non-volatile memory.

It is a further object of the invention to provide a capacitive reader for an identity verification system, the reader reading data from an escort memory borne by an individual whose identity is to be verified. It is yet a further object of the invention to provide such a capacitive reader that not only reads data, but that also senses the proximate presence of the individual by measuring a change in capacitance to an electrical ground occurring responsive to the individual's approach. It is moreover an additional object of the invention to provide a proximity sensing and data communicating capacitive reader emitting a plurality of voltage pulses acting to electrically power an escort memory carried by the individual.

It is another object of the invention to provide apparatus and method for verifying the identity of an individual who is in physical contact with a data bearing record portion of the system and who brings the data bearing record proximate to, but not into physical contact with, a reader portion of the system. It is additionally an object of the invention to provide such non-contact apparatus and method operable only over a restricted range, the range chosen to preclude another person from surreptitiously intercepting or eavesdropping on the process of communicating data between the reader and the data-bearing record.

It is yet a further object of the invention to provide a system controlled by a data-bearing record, the system comprising a reader and an escort memory, wherein the reader comprises an energy-efficient circuit operable for several years from a single battery, and where the escort memory is contained in a small object, such as a finger ring, that can be easily carried by a user.

It is yet an additional object of the invention to provide a system for verifying the identity of a cooperating user bringing a data beating record adjacent a reader, where the data bearing record, as long as it is within a predetermined range of the reader, may have an arbitrary geometrical orientation during the process of communicating the data.

It is yet a further object of the invention to provide a capacitive keying method for communicating data to a capacitance sensor from a non-volatile memory disposed on a carrier proximate the sensor. The method is carried out by controllably changing a reactance of a circuit element on the carrier, the change in reactance being sensed by the sensor as a change in capacitance to ground.

DESCRIPTION OF THE PREFERRED EMBODIMENT

Figure 1:
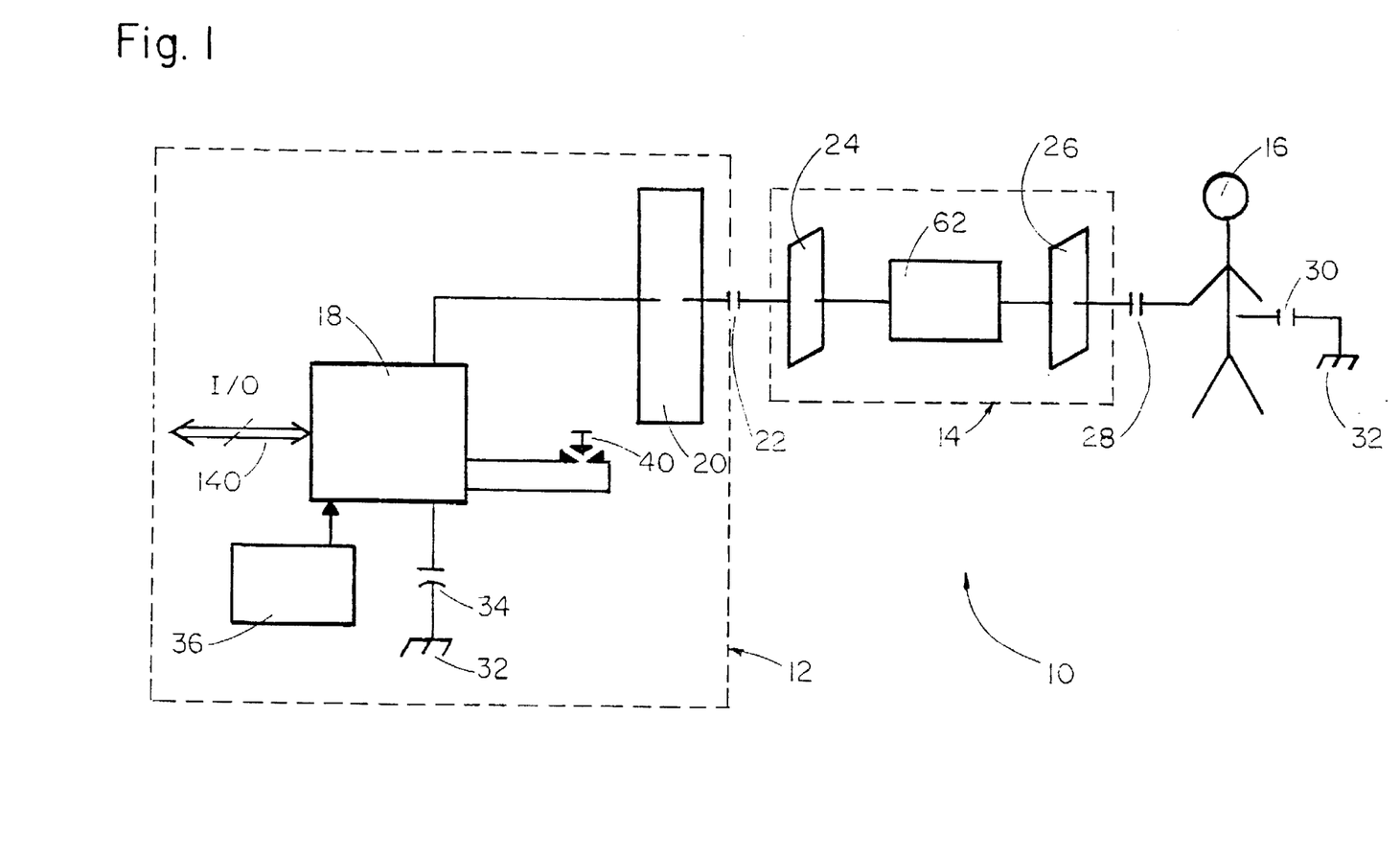
FIG. 1 of the drawing is a schematic block diagram of a system of the invention

Turning initially to FIG. 1 of the drawing one finds a schematic block diagram of a system 10 of the invention comprising a reader apparatus 12 and a portable data-bearing record or escort apparatus 14 (which in some embodiments may have the physical appearance of a wallet-sized card or of a key) borne by an object or user 16. In the operation of this system 10 an alternating current signal generated by reader circuits 18 is applied to a reader electrode, or plate 20, and is capacitively coupled (via a capacitance 22 between the reader plate 20 and an escort communication plate 24) to the record 14 which has a second, bearer, plate 26 coupled to the user 16 via a schematically indicated user-record capacitance 28. The user 16 has a capacitance (indicated as 30 in FIG. 1) coupling the AC signal to an electrical ground 32. The reader 12 also has a capacitance (indicated as 34 in FIG. 1) to ground 32 coupling the AC current back to the reader circuits 18 and thereby completing the current loop.

It will be appreciated that any of the electrical couplings may be capacitors, as shown in FIG. 1 with reference characters 22, 28, 30, 34, or may be direct contacts (e.g., as would occur if the user 16 holds the card or record 14 by the bearer plate 26) which may or may not have an appreciable electrical resistance. Regardless of the value of any conductance portion of the electrical coupling reactance, the current loop would still be completed. Alternately, additional capacitive elements (not shown) may be intentionally introduced. Introducing such an additional capacitive element between the reader circuit 18 and the reader plate 20 would eliminate any potential low frequency or DC shock hazard in cases where the reader 12 is line powered, but would not materially affect the operation of the system. Although a preferred embodiment of the system 10 uses trains or bursts of binary pulses, it will be understood that a variety of approaches exist for supplying the requisite AC current to the system 10. These include, inter alia, sinusoidal waves, and pulses having triangular or other shapes. Moreover, the alternating electric current need not alternate about zero volts and can be arbitrarily offset therefrom. It will also be appreciated that the electric ground 32 of the system 10 need not be an actual earth ground. In some situations encompassed by the invention (e.g., a telephone debit card used in an aircraft operating at a high altitude) a local environmental ground, which needs have no predetermined relation to an actual earth ground, may be employed.

Although the power supply 36 powering the reader 12 may be connected to the AC maim, in many cases it is desirable to provide a reader 12 comprising a battery 38 that is its sole source of electric power, as will subsequently discussed herein with respect to FIG. 8 of the drawing. In order to prevent excess current drain and permit battery-powered operation, a mechanism 40 may be employed to provide a low duty-cycle operation of the reader 12—e.g., the mechanism 40 may wake the reader 12 from a quiescent "sleep" mode when a user 16 is detected nearby. Although this mechanism 40 is depicted in FIG. 1 as a mechanical switch connected to the reader circuits 18, other approaches, such as those employing infra-red proximity sensors, are known in the art. As will be subsequently disclosed herein, a preferred embodiment of the invention uses a capacitive proximity sensing apparatus and method previously disclosed by the inventor in his co-pending U.S. Pat. No. application entitled "Time Domain Capacitive Field Detector" and referred to supra.

Figure 2:
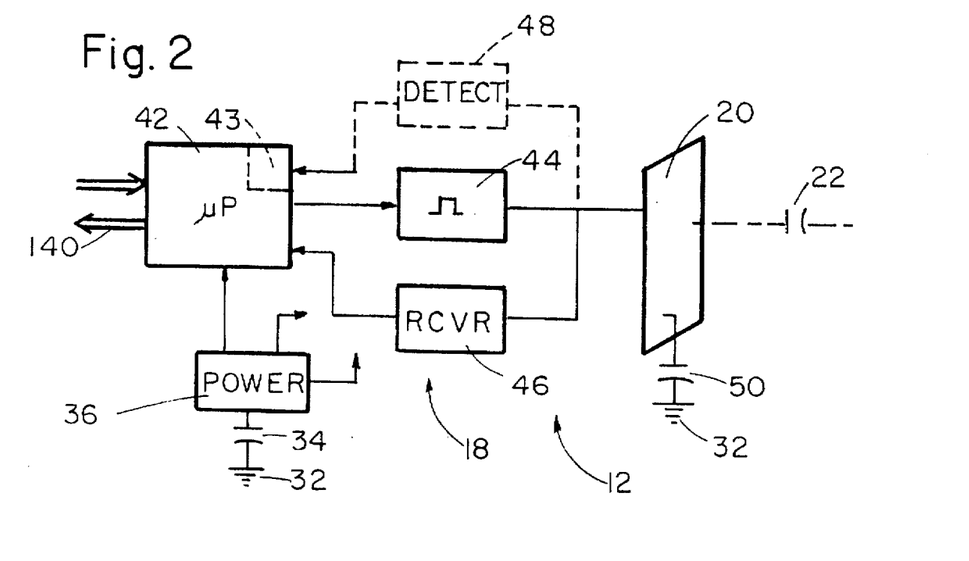
FIG. 2 of the drawing is a schematic block diagram of a reader employed in a preferred system of the invention.

Turning now to FIG. 2 of the drawing, one finds greater schematic detail of the reader circuits 18, which are preferably controlled by a microprocessor 42, and which comprise a pulse output circuit 44 to generate pulses applied to the reader plate 20. In many embodiments the reader circuits 18 also comprise receive circuits 46 to condition received signal pulses prior to supplying them to the microprocessor 42. Optional capacitive detection circuitry 48 is used in a preferred embodiment to detect the presence of the data-bearing record 14, or of a bearer or carrier 16 thereof, and thereupon to provide a wake-up command to the balance of the reader 12. As will be discussed subsequently hereinafter, the detection circuits 48 and pulse circuits 44 are advantageously combined in a preferred embodiment. One may note that in addition to the coupling capacitance 22 between the plate 20 and one of the electrodes 24 on the record 14, there is also a capacitance 50 between the plate 20 and ground 32 that is sensed by the optional detection circuitry 48. The effect of this capacitance 50 must be dealt with in order to accurately detect the presence of an escort apparatus or record 14 proximate the reader 12.

Figure 3:
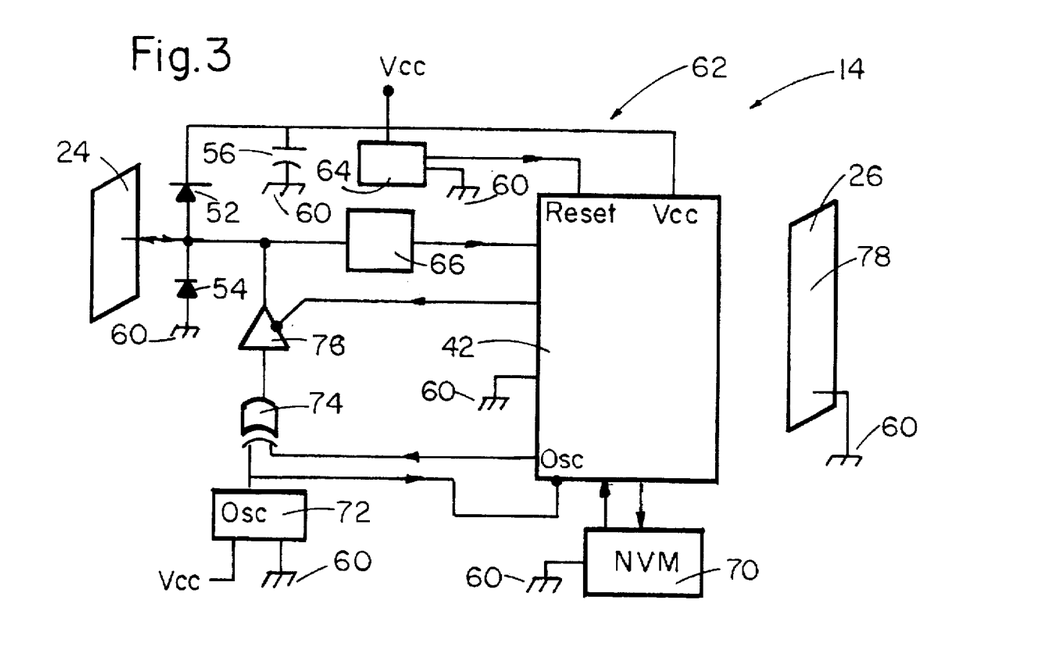
FIG. 3 of the drawing is a schematic block diagram of a personal identification and escort data storage device of the invention.

Turning now to FIG. 3 of the drawing, one finds a schematic depiction of a preferred escort apparatus 14 in which the communication plate 24 is connected to two diodes 52, 54 that rectify the AC current passing through the plate 24. The combination of these diodes 52, 54 with a relatively large value energy storage capacitor 56 may be recognized as a single stage charge pump. Electric power for the escort apparatus 14 may be seen to be derived from the AC current flowing through the plate 24, pumped into the large capacitor 56, and drained through the internal ground 60 or chassis common of the escort apparatus 14. When the apparatus 14 is placed in a suitable AC field, with the bearer plate 26 capacitively coupled to a current return, such as an earth ground 32, the energy storage capacitor 56 begins to charge. If the field is intense enough, and of high enough frequency, it has been found that enough power can be extracted from this field to charge the storage capacitor 56 to a dc voltage exceeding the minimum predetermined voltage required to power the escort circuitry 62 for intermittent operation. When operated in this mode, a low voltage detector 64 is preferably used to provide a startup-reset signal to the microprocessor 42 whenever enough energy has been stored to permit operation.

When the bearer plate 26 is coupled to a user 16, and via the user 16 and a ground 32 back to the reader 12, a complete current loop is formed thus permitting the system 10 to function. It should be clear to those skilled in the art that while a direct connection between the user 16 and a metallic sheet 78 may be provided in many cases, a capacitive coupling between a user 16 who is physically separated from the escort apparatus circuitry 62 (e.g., by a thin dielectric plastic film of the sort used to laminate electronic components into a smart card) would also serve this purpose. For efficient coupling, the system 10 may be configured so that the user 16, if separated from the bearer plate 26 by a dielectric having a first thickness (e.g., the thickness of the plastic laminate), is also separated from the escort communication plate 24 by a substantially greater dielectric thickness (e.g., the spacing, measured in the plane of the plastic laminate, between the two plates 24, 26 of a card). It will be appreciated to those skilled in the art that the unequal capacitances evoked in the preceding example can also be achieved by choosing materials of varying dielectric constants, rather than by varying dimensions of a single material.

Because the various elements of a circuit 62 each provide a capacitance to the outside world (e.g., as represented by the area of a copper trace on a circuit board), some embodiments of the circuit 62 may have adequate inherent capacitance so that a separate physical element may not be necessary to serve the function of the bearer plate 26. As yet a further point, one may note that although the discussion herein presented generally describes particular embodiments in which the user or bearer 16 is a person cooperating with the system to have his or her identity verified, this terminology is one of convenience only, there being no requirement that the bearer 16 be human, or, for that matter, even be animate. The bearer 16 could, for example, be a box having an escort apparatus 14 of the invention embedded in a shipping or inventory control label adhered thereto.

It should also be clear that either of the electrodes 24, 26 may be coupled to the user 16, with the other one 26, 24 being coupled to the reader 12. This is true because the internal common 60 is floating with respect to the reader 12. Thus, AC currents will flow through the key just as well in either direction. While the AC phase will be inverted inside the key from what might be considered 'normal', the signal will be just as strong in amplitude and just as detectable. In certain data modulation schemes this may pose a minor problem that is readily soluble by appropriate control logic or software in a program stored in a memory 43 and operating the controller 42.

An input circuit 66 is provided intermediate the plate 24 and the microprocessor 42. In one embodiment, in which individual pulses are to be counted, or in which high pulse rates are to be used, the input circuit 66 comprises a buffer amplifier having a low input capacitance so as to transfer the signal from the plate 24 while depriving the plate 24 of as little charging current as possible. In these embodiments, the controller 42 is presented with the actual signal found on the plate 24 with only electrical buffering. This allows the controller 42 to recognize individual pulses emanating from the reader plate 20, and hence, can result in fairly high data rates. In another embodiment, which might be chosen for ambients having significant noise background, the input circuit 66 may comprise known signal detector circuits to filter the input signal so as to ignore single pulses but to be responsive to either the occurrence or omission of groups of pulses. In either of the foregoing variations, it may be noted that the escort apparatus 14 will normally be used in close proximity to a reader 12 providing a high input signal level, so that great sophistication in the input signal processing circuitry 66 is generally not required.

In operation of the escort apparatus 14, when one of the plates 24, 26 is brought into proximity or contact with a reader plate 20, the reader circuit 18 may generate a prolonged AC signal (or preferably a binary pulse train). This acts to charge the energy storage capacitor 56 to a high enough level that the low voltage detector 64 brings the controller 42 out of reset and the controller 42 begins to function. Its first task is to examine the signal from an input circuit element 66 for a gap in the AC charging signal. If it finds one, it sends back to the reader 12 a pulse or burst of pulses (or a coded train of pulses or a coded train of bursts of pulses) by appropriately gating an output to form a modulation pattern of either a direct bitstream, on/off key modulated or PSK modulated data. From this point forward, communication between the reader 12 and the escort apparatus 14 is established and may be maintained as long as the reader 12 and escort apparatus 14 are in close proximity.

The discussion of the escort apparatus 14 of FIG. 3 has, so far, described only means whereby data may be transferred from the reader 12 via capacitive coupling to the microprocessor 42, and which may thereafter be stored in a non-volatile memory 70 (which is preferably a separate EEPROM device in those embodiments of the invention calling for the escort device 14 to also receive data from the reader 12, but which may be an integral portion of the microprocessor 42) responsive to suitable logical operations carried out by the microprocessor 42 under the control of a program stored in a ROM 43, which may be an integral part of the microprocessor 42, as is common in the art. It is expected that most of the uses of the system 10 of the invention will be directed toward communication of a datum from the non-volatile memory 70 to the reader 12. In the embodiment illustrated in FIG. 3 of the drawing the data uploading portion of the bi-directional communication scheme is preferably carried out by the combination of an oscillator 72, an exclusive-OR gate 74, and a tri-state gate 76. It may be noted that the use of the XOR gate 74 allows one to provide a simple phase-shift keying (PSK) modulation scheme for modulating the encoded datum onto the output of the oscillator 72 and thereby generating a time-varying voltage on the escort communication plate 24 that is representative of a datum stored in the EEPROM 70 and that is sensed by the reader 12. However, the XOR gate 74 may be omitted if even simpler means of generating an encoded signal receivable by the reader plate 12 are desired.

Figure 4:
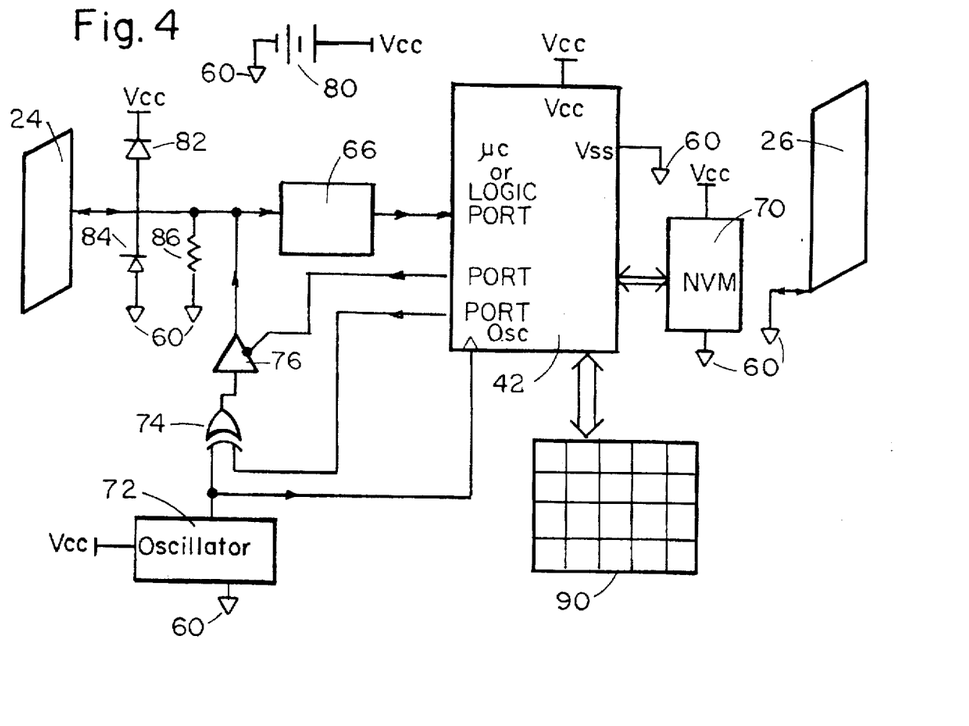
FIG. 4 of the drawing is schematic block diagram of an alternate embodiment of the personal identification apparatus of the invention.

Turning now to FIG. 4 of the drawing, one finds an escort apparatus 14 powered by a battery 80, which is preferably a low current output battery of the sort conventionally used in wristwatches and other user-borne apparatus. In the embodiment of FIG. 4, diodes 82 and 84 act to center the received signal about a logic crossover point, while also providing static discharge protection. A resistor 86 that has a high value is employed to maintain a logic '0' input when the apparatus is not in use, thus avoiding energy loss due to CMOS crossover conduction, and also to minimize spurious signals to the controller 42.

Battery-powered operation of an escort apparatus 14 may find utility in instances where more sophisticated functionality of the escort apparatus 14 is desired. For example, a self-powered escort apparatus 14 may also act as a reader 12. As an example, consider a house security application in which the escort apparatus 14 functions as an electronic key and in which the reader 12 is operatively associated with a door lock. The owner of the exemplar house might want to lend a house key to a neighbor while on vacation. By bringing a powered key 14 into proximity with a second key 14 (which need not be powered), command streams and data may be transferred to the loaned, unpowered key 14 to grant access permission for a predetermined period of time. To facilitate having a powered escort apparatus 14 that functions in such a fashion, a small keypad 90 may be incorporated into that device 14.

As yet another variation on the structure of the escort device 14, one could provide both battery-powered and charge pump operation. In such a device the failure of the battery 80 would still allow the escort apparatus 14 to communicate data from its non-volatile memory 70 to a powered reader 12 acting to charge an energy storage capacitor 56.

Figure 5:
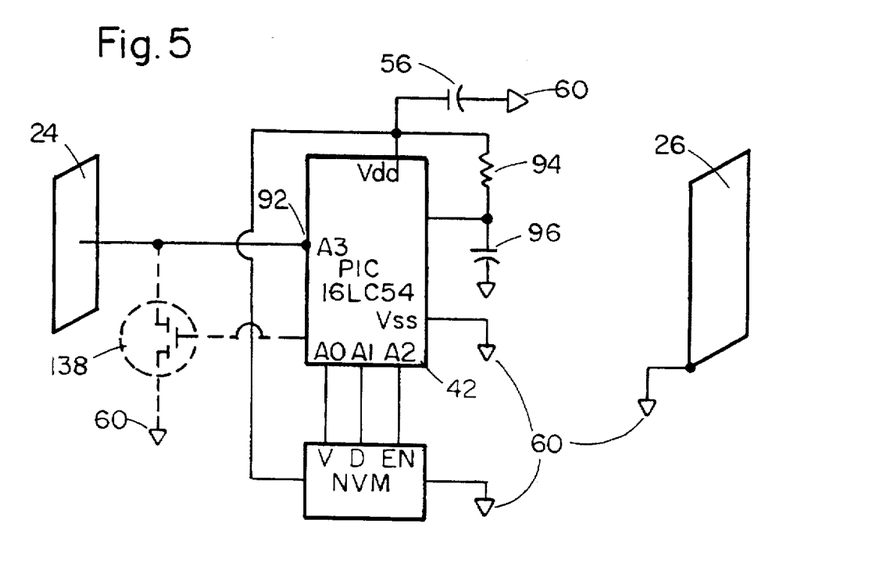
FIG. 5 of the drawing is a circuit schematic showing a specific implementation of the apparatus of FIG. 3.

A specific embodiment of the escort apparatus 14 may be seen in FIG. 5 of the drawing. This embodiment incorporates a commercially available microcontroller 42 (e.g., a type PIC16LC54). Although not readily apparent, the circuit of FIG. 5 is nearly an exact realization of the schematic of FIG. 3. Diodes 52 and 54 of FIG. 3 are built into the input/output (I/O) pin 92 of the controller 42 for static protection purposes. Because the currents are quite small, this poses no problem in charging the energy storage capacitor 56. The low voltage detector 64 of FIG. 3 is also built into the PIC16LC54. The oscillator 72 of FIG. 3 is realized in the circuit of FIG. 5 with the combination of a resistor 94 and capacitor 96. Because the port pins 92 of the PIC16LC54 are bi-directional, the function of the tri-state gate 76 is also assumed by the controller 42. Although the oscillator output frequency cannot be directly generated by the port pin 92, the microprocessor 42 can easily toggle the port pin 92 rapidly enough, under the control of a stored program, to generate a signal easily recognized by a reader device 12. In this case the input signal conditioner 66 of FIG. 3 is omitted because the capacitive and resistive loading of the controller's port pins 92 is quite small.

Figure 6:
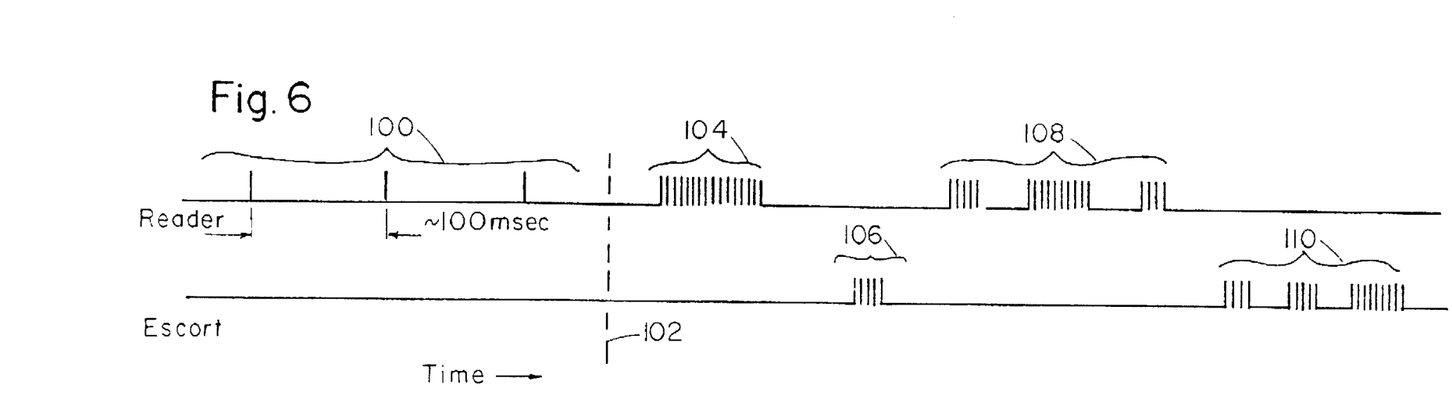
FIG. 6 of the drawing is a timing diagram for a typical communication process occurring between an escort apparatus and a reader of the invention FIG. 7 of the drawing is a state flow diagram showing the initiating interaction sequence for communication between an escort apparatus and a reader of the invention.

Turning now to FIG. 6 of the drawing, one finds a timing diagram of a typical communications interaction between a low duty cycle battery powered reader circuit 18 and an escort apparatus 14 powered by an energy storing capacitor 56. During an initial time interval 100, no escort device 14 is near the reader plate 20, and the reader 12 is in a quiescent or sleep mode to conserve electrical power. Every tenth of a second or so the reader circuit 18 wakes up and measures the capacitance of the plate 20. If there is no significant change from a prior reading, the reader circuit 18 goes back to sleep. If, on the other hand, a significant increase is detected (e.g., as shown at an instant labeled with the reference numeral 102 in FIG. 6), the reader 12 assumes that an escort apparatus 14 has been brought within a detection range, and the reader 12 enters an interrogation interval 104 during which the reader 12 emits a burst of sustained alternating pulses from its plate 20 for the dual purposes of charging the supply circuit 56 of an escort apparatus 14 (if required) and for initiating data communication with the escort apparatus 14 if the escort apparatus 14 is within communication range (which is generally less than the detection range) of the system. It will be realized by those skilled in the art that in a system 10 in which the escort apparatus 14 is supplied with a battery 80, the burst can be made very short. After the burst period 104, the reader enters a receive mode, wherein it looks for a response, which may be a pulse or a burst of pulses 106 from the escort apparatus 14. If no response is detected by the reader 12, the burst period, the reader 12.the burst period may be repeated, or, the reader 12 may loop back to the onset of the sleep portion of the duty cycle. As is known in the art, a response burst 106 may be a complete data train containing a code and/or command. Subsequent to the response burst 106 being received by the reader 12, the escort apparatus 14 and reader 12 may communicate, providing either a bi-directional or a unidirectional flow of data and commands in some manner suiting a selected system application. An example of such a bi-directional flow of data is shown in FIG. 6 with pulse groupings denoted with the reference numerals 108 and 110.

Figure 7:
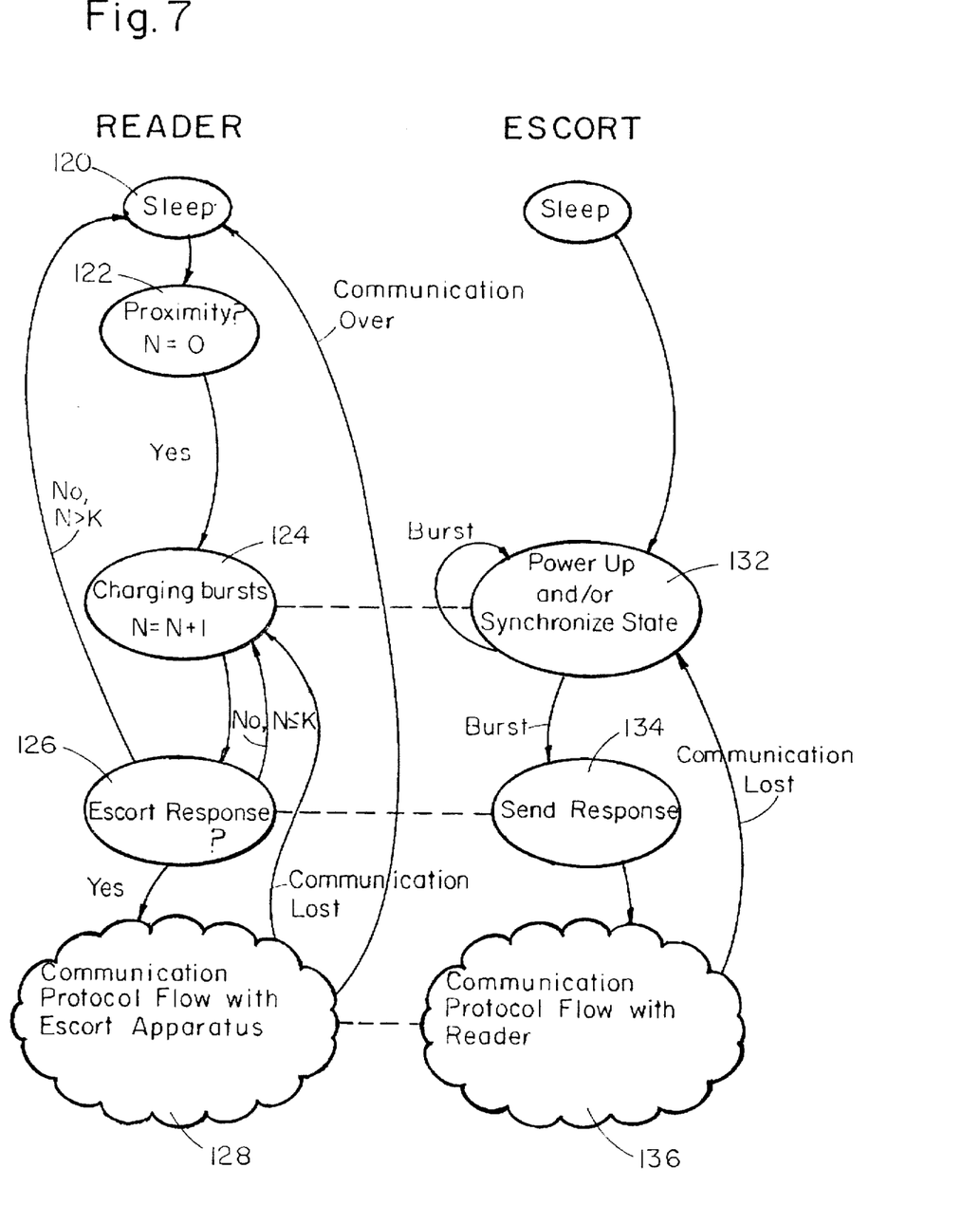

Additional detail of the operation of a system 10 is depicted in the state flow diagram of FIG. 7 of the drawing. As previously noted, the reader circuit 18 is normally in a low power 'sleep' state 120. Every so often it wakes from sleep and enters a state 122 wherein it checks for an escort apparatus 14 near the reader plate 20. If proximity is detected, the system 10 proceeds to a communication initiation state 124 wherein a pulse burst 104, comprising a periodic sequence of voltage pulses applied to the reader plate 20, is emitted. The reader 12 then enters a response-awaiting state 126. In a preferred embodiment, the initiation 124 and response-awaiting 126 states are repeated a predetermined number of times before the reader 12 gives up and returns to sleep mode 120. By keeping the duration of the recognition burst 104 short, the reader 12 allows for the rapid initiation of communications with an escort apparatus 14 that has a battery 80 built in and thus does not require a sustained charging interval. If a response is detected by the reader 12 when it is in the response-awaiting state 126, the reader 12 moves to an interactive communication state 128. Should the communications be lost (e.g., if the user 16 moves too far from reader plate 20), the reader 12 initially as shown by line 130) loops back to state 124 to attempt to reestablish communications. It should be noted that in simple systems of the invention 10, the communication state 128 may not be required—e.g., if the escort apparatus 14 is designed to do no more than to transmit an identification code during a single response to the initiating burst 104.

A parallel set of flow states is followed by the escort apparatus 14. When the escort apparatus 14 receives a set of initiating pulses 104, it powers up (if it has no functioning battery ) or wakes up (if battery-powered), and also synchronizes with the reader 12 in an escort initiation state 132. After a number of bursts provide sufficient power (or immediately after the first burst if a battery 80 is incorporated into the escort apparatus 14), the escort apparatus enters a response mode 134 in which it responds to the reader 12 with an initiating burst. This burst may be a simple single pulse or short burst, or a complete pulse or burst train to transfer a data stream to the reader 12. As with the reader 12, the escort apparatus 14 may then enter a communication state 136 for further data communications. As with the reader 12, if the escort apparatus 14 senses a loss of communications it may return to its initiation state 132 and attempt to re-synchronize.

Although the preceding discussion is directed toward a generally asynchronous, half duplex communication scheme, the system of the invention is not so limited, and may, in some circumstances be advantageously configured in a synchronous half- or full-duplex mode. For example, the escort apparatus 14 could be configured to superimpose data, at a first frequency, on pulses emitted from the reader 12 at a second frequency. Synchronous designs, in which the reader 12 emitted pulses regularly during the period of communication, could be advantageous for systems in which large amounts of data were to be transferred from the escort apparatus 14 to the reader 12, and in which the escort apparatus 14 was powered only by a charge storage capacitor 56. In such as system regular pulses from the reader 12 could ensure adequate power to the escort apparatus 14 during an extended communication interval.

It may be appreciated that if the reader 12 is line powered, the sleep and capacitive detect functions (state 120) may be omitted. Instead, the reader 12 may simply emit repeated initiation bursts 104 spaced by short intervals to 'listen' for a response 106. Moreover, an external sense means ,such as a switch 40, can be used to wake up the reader circuit 18 from a sleep state 120 and cause a transition directly to state 122.

One may note that the simple on/off key-modulated pulse bursts shown as 106, 108, 110 may be replaced with direct bit streams for use with a key circuit of the type shown in FIGS. 3 and 5. It is also possible to employ a variety of other modulation schemes (e.g., frequency shift keying or phase shift keying) and it is not to be inferred that any one of these is always preferable to any other. It is often desirable to employ one type of modulation from reader 12 to escort apparatus 14,(e.g., a direct bit stream), and another type of modulation in the return communication path (e.g., FSK or PSK), for the simple reason that the signal level transmitted by the escort apparatus 14 is likely to be weaker than that transmitted by the reader 12, due to the need for low power and low voltage operation within the escort apparatus 14. Hence a lower signal-to-noise ratio is expected in the return path and the use of FSK or PSK would be expected to provide better signal detection than would simple on/off burst modulation. The generation of FSK or PSK signals is a nearly trivial function of the software, which may directly synthesized these modulations at an I/O pin 92. Alternately, this functionality could be provided with optional logic such as an exclusive-or gate 74. PSK has the added advantage of being more difficult to intelligently intercept than the other methods, and can operate at data rates higher than all other methods, save direct bit stream signals. The reader circuit 18 may have the luxury of using amplifiers and phase lock loops, as an example, to decode PSK and FSK signals, since it does not have nearly the physical size, power, and complexity constraints of its associated escort device 14.

The system of the invention also permits a "capacitance keying" arrangement in which data are transmitted by modulating the apparent capacitance sensed by the reader 12. For example, the escort apparatus 14 may be configured to either clamp or unclamp the escort communication plate 24 from ground 60 to provide the requisite modulation. In FIG. 5 of the drawing, this functionality is schematically indicated with an optional switching element 138 operating under control of the microprocessor 42. When the communication plate 24 is clamped to ground 60 the reader 12 will measure a slightly higher capacitance than when the plate 24 is unclamped and allowed to float. It will be understood by those skilled in the art that a separate switch 138 is not necessary to provide this functionality, as the input/output port 92 of the microprocessor 42 can be switched to ground 60 under program control to modulate the measured capacitance.

Yet another approach to capacitive keying is that of pulsing the communication plate 24 in synchronism with pulses received from the reader 12. For example, a "1" message bit could be generated by driving the communication plate 24 positive when the voltage on the reader plate 20 drops due to the onset of conduction by the mosfet discharge switch 182. This coding method has the advantage of providing stronger signals to the reader 12, and may allow one to simplify the reader 12 by deleting the receiver circuits 46. That is, an advantage 20. of capacitive keying is that the capacitive detection circuits 48, which are expected to be employed in any reader 12 employing proximity sensing, can also serve the function of the receiver circuitry 46 used with other keying schemes.

Figure 8:
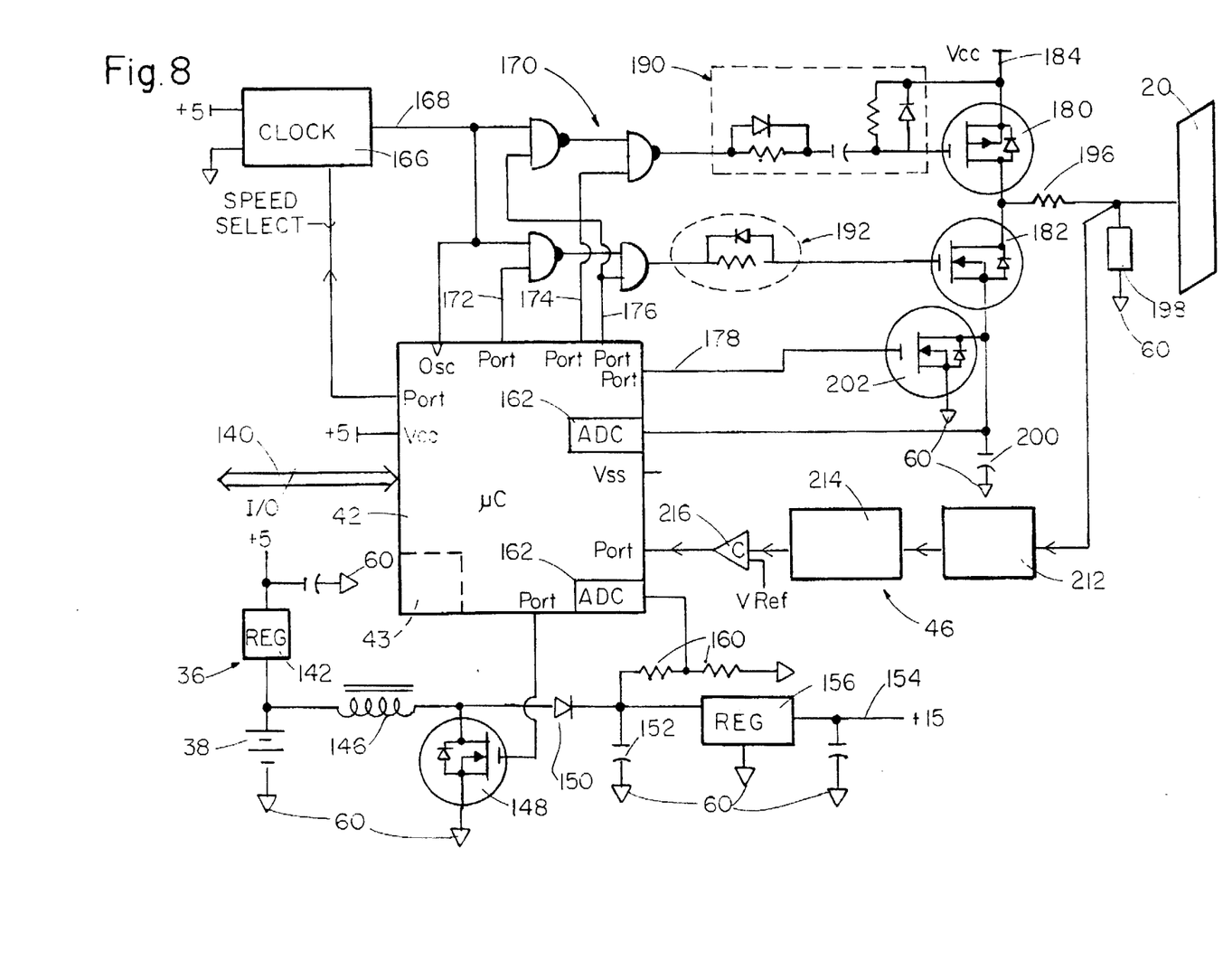
FIG. 8 of the drawing is a schematic circuit diagram of a preferred embodiment of a reader.

Turning now to FIG. 8 of the drawing, one finds a battery-powered embodiment of the reader 12. All the operations of the reader 12 are directed by a controller 42, which interacts with external devices, (e.g. a door lock securing access to a controlled area) via I/O lines 140. The power supply 36 may comprise a nine volt battery 38 and a voltage regulator 142 having a five volt output. In order to provide the higher voltages needed for the plate 20, a voltage boost circuit 144, which may comprise an inductor 146, a mosfet transistor 148, a diode 150 and a capacitor 152, can provide an output of seventeen volts. This is regulated down to a stable fifteen volts on a supply line 154 by a regulator 156. A voltage divider 160 feeds a fractional part of the voltage on the capacitor 152 to an analog to digital converter (ADC) input 162 of the controller 47. If the voltage on the supply line 154 drops too low, the ADC input 162 acts to boost it again by toggling the gate of the mosfet transistor 148 one or more times.

The controller 42 is clocked by a reader clock 166, which has both a slow and a fast operating speed, the slow speed being used to conserve power when in sleep mode, and the fast mode being used when the reader circuit 18 is active. The reader clock line 168 is also used directly to generate the sustained capacitive field bursts, such as during the charging interval 104, and possibly also during data transmissions when short bursts of pulses are used to define the 1's and 0's of a data stream. This my be done, for example, in conjunction with an escort apparatus receive circuit 66 comprising a filtering signal detector as discussed supra. The logic gates 170 are used to steer either the clock output 168 or control signals on selected output lines 172, 174, 176 to mosfet transistors 180, 182 in order to define the pulse edges used during the various modes. Output from the microprocessor 42 via the control lines 172,174, 176 controls the mode of the logic gates 170. In one such mode, the clock output 168 is directly gated to both mosfets 180,182, thus creating a square wave on the reader plate 20 at the higher of the two frequencies of the reader clock 166 In another mode, the clock output 168 is cut off from the mosfets 180, 182, and the lines 174 and 176 are used to generate charging and subsequent discharging pulses that are directly synthesized in software, at lower rates than would be possible running directly from the clock line 168. The first, faster, mode is used to provide the fast burst rate of the recognition interval 104 The slower rate is used to provide for capacitive detection during the quiescent interval 100, and may also be used to provide direct data transmission to an escort apparatus 14.

Other elements involved in controlling the mosfets 180, 182 comprise a network 190 that provides level shifting and edge rate controlling for the gate of the one mosfet 180, and a network 192 providing an edge rate control function for the gate of the other mosfet 182. Protection of the mosfets 180, 182 is provided by a resistor 196 used in conjunction with an electrostatic discharge clamping network 198, which may comprise a zener diode, diode network, or other known apparatus.

The sensing capacitor 200 and an associated mosfet 202 are part of a charge measurement function central to the measurement of the capacitance to ground of the plate 20. As described in greater detail in the inventor's copending patent application entitled "Time Domain Capacitive Field Detector" and referred to supra, the preferred measurement method comprises charging the plate 20 from a voltage source 184 during a charging period defined by the width of a pulse applied to the charging mosfet 180; subsequently discharging the plate 20 for a discharging period defined by the width of a pulse applied to the discharging mosfet 182; and then reading the charge accumulation on the sensing capacitor 200 by digitizing (with an ADC 162) the voltage on the sensing capacitor 200 and supplying the digitized representation of that voltage to the microprocessor 42.

During communication receiving intervals, the mosfets 180,182 are turned off by control signals supplied via control lines 172, 174, 176. Thus, the plate 20 'floats' electrically, although it remains clamped in a range from about −0.55 to +15.55 volts by reverse diodes intrinsically incorporated in the mosfets 180, 182. An external alternating c-field, such as that produced by an escort apparatus 14, will easily induce a corresponding signal within this voltage range in the reader plate 20.

To process the communication signal received by the plate 20 in the case of an on/off modulated communication scheme, the reader 12 may employ receiver circuits 46 comprising the depicted combination of a bandpass filter 212, a signal detector 214, and a voltage comparator 216. In the case of a PSK modulation scheme one could use a circuit having a similar schematic in which the bandpass filter 212 was replaced with an amplifier and the signal detector 214 was replaced with a phase lock loop that, depending on a choice of design details, may not require a following comparator 216. In yet another communication scheme, that of sending direct bit stream data to the reader 12, the receiver 46 might comprise only an amplifier and a comparator. Numerous other known demodulation methods may be employed Although the depiction of FIG. 8 shows preferred apparatus having a low energy consumption, or sleep, mode and a higher energy consumption, or active, mode and logical means within the microprocessor 42 to toggle between the two modes by changing the operating rate of a clock 166, it will be understood that a variety of means are known in the art for selectively causing an apparatus to operate either in a sleep mode, in which only low energy consumption tasks, such as storing data and keeping an accurate time record, are carried out, or in an awake mode in which higher energy consumption tasks, such as data communication, are carried out. The known approaches include, inter alia, employing electric switching means in a battery-powered system to selectively power or inactivate a high power consumption apparatus; providing separate energy storage means, such as a back-up battery, to power the low energy consumption portion of the system, while relying on power from the AC mains to power other portions of the system, etc. It is noteworthy that the invention provides a means of using a battery-powered reader 12 in a system 10 transferring data between the reader 12 and an escort apparatus 14, without requiring the use of readily contaminated electrical contacts, as are used to wake up some systems.

Figure 9:
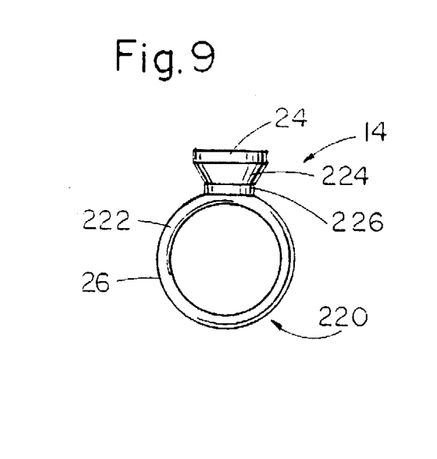
FIG. 9 of the drawing is an elevational view of an escort apparatus of the invention incorporated into a finger ring.

Turning now to FIG. 9 of the drawing, one finds an escort apparatus 14 of the invention configured as a finger ring 220. In this embodiment the toroidal band portion 222 of the ring 220, being a piece of metal in contact with the wearer's finger, acts as the user plate 26. The crown 224 of the ring is constrained to be separated from the band 222 by a dielectric 226. The crown 224 is also constrained to have a conductive portion forming the sensing plate 24 of the escort apparatus 14 and to contain the requisite escort apparatus circuitry 62. By holding the crown up to a reader plate, communications is established in accordance with the principles disclosed supra.

Figure 10:
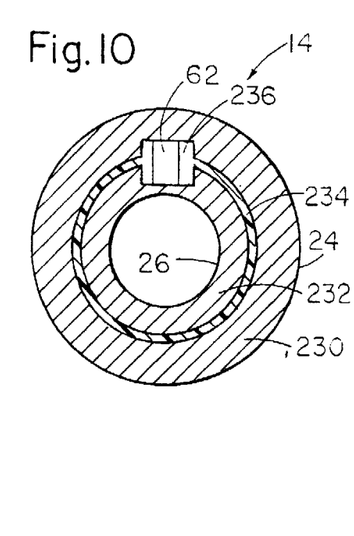
FIG. 10 of the drawing is a schematic cross-sectional view of an alternate arrangement for incorporating the escort apparatus of the invention into a finger ring.

An alternative design for a ring-shaped escort apparatus 14 is depicted in FIG. 10 of the drawing. Here, a ring, having no particular crown, comprises two concentric electrically conductive bands 230, 232 separated by an interposed concentric dielectric 234. The escort circuit 62 may be situated in a cavity 236 intermediate the two bands. In this realization of the invention, the inner band 232 acts as the bearer plate 26, and the outer band 230 acts as the communication plate 24. The radial symmetry of this configuration indicates that a wearer 16 can place his or her hand onto a reader 12 with the palm either facing or turned away from the plate 20. It should be noted that rings 220 will operate even through gloves, and can be used to provide positive identity to readers incorporated in all manner of objects, including weapons, such as a police officer's handgun.

Figure 11:
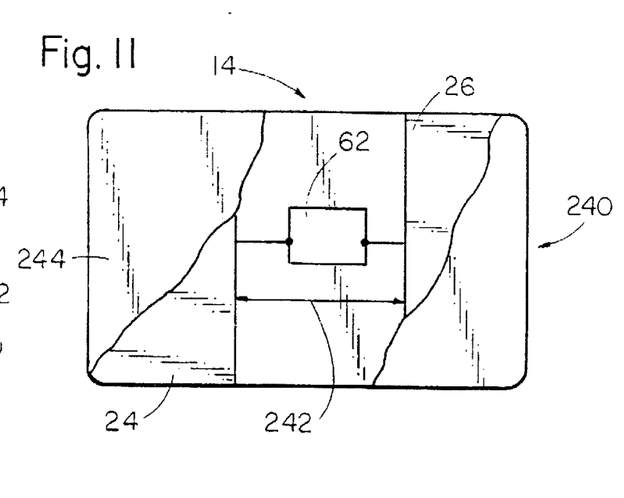
FIG. 11 of the drawing is a partly cut away plan view of an escort apparatus of the invention having a smart card or credit card format.

Turning now to FIG. 11 of the drawing, one finds an escort apparatus 14 of the invention configured as a card 240, wherein the circuitry 62 and the plates 24, 26 are laminated between two sheets of plastic. As noted supra, no metallic surface need appear on the exterior of the card, as both the reader 12 and user 16 can be capacitively coupled to the escort circuitry 62. The plates 24, 26 extend a reasonable distance towards the center of the card, leaving a gap (indicated with the double headed arrow 242 in FIG. 11) between the two, the extent of the gap 242 being substantially greater than the thickness of the plastic laminating film 244 covering the plates 24,26. The plates 24, 26 come as close to the longitudinal ends as possible without surfacing along the edges, so as to provide maximal capacitive coupling when held edge-on adjacent a reader plate 20. The circuitry 62 of this embodiment is preferably designed so that either end of the card 240 may be used as either the communication plate 24 or as the user contacting plate 26.

It will be appreciated that a great many other configurations are possible for the system of the invention 10. For example, one could use the system 10 to control the locking of an automobile door having a reader plate 20 disposed on a window of the automobile as is taught for a different sort of security system in U.S. Pat. No. 4,760,394 by Takeuchi et at. As another example, one could use the system of the invention 10 for reading an identity card at a point of sale (e.g., at a retail check out counter) having a reader plate 12 and otherwise operating in a manner analogous to that disclosed by Lyndon-James et al., in U.S. Pat. No. 4,800, 543. As yet another application, a reader 12 of the invention could be integrated into a pay telephone and an escort apparatus 14 having the configuration described supra with respect to FIG. 11 of the drawing, could be employed in the same manner as a well known telephone debit card.

It will be appreciated that the security techniques being contemporaneously discussed regarding 'smart card' functions such as encryption, rotating access codes, biometric data inclusion, and the like may all be incorporated into the system of the invention 10. The system 10 has no inherent properties or structural limitations that would render either the reader 12 or escort apparatus 14 incompatible with enhancements of these sorts and all such combinations may be apprehended as being within the scope of the present system.

An important feature of the invention is the provision of a duplex data stream across a unary electrical connection between a reader 12 and an escort apparatus 14 comprising a non-volatile escort memory 70, the current preferably flowing capacitively across a dielectric gap or alternately across an actual direct conductive contact between reader 12 and key 14, there being no explicit second contact or coupling between reader 12 and key 14, and only capacitive coupling being required between the user 16 of the system 10 and an electrical ground 32.

An important advantage of the system of the invention 10 is that the generation of a magnetic field is an incidental artifact of the system 10, and is not substantially or necessarily employed as a means to transmit data and power. The reader and escort sensing apparatus plates 20, 24 are C-field plates, and do not require loops or lengths of wire for magnetic coupling. No RF resonant antenna circuits are employed. The C-fields are short range and not self-propagating in nature. The only magnetic and electromagnetic fields created during the use of the system are generated by virtue of the alternating nature of the very small currents traveling through the loop that encompasses the reader 12, escort apparatus 14, bearer 16, and earth 32. The largest of these occurs when the reader 12 emanates its fields, and a substantially weaker one occurs when the escort apparatus 14 responds.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

I claim:

1. A system comprising a reader apparatus electrically coupled to an electrical ground and an escort apparatus having a datum stored therein, wherein the reader comprises a reader plate, a source of dc voltage, a pulse generating means generating a charging pulse and a subsequent discharging pulse, a charging switch having an open state and a closed state, the charging switch moving from its open to its closed state responsive to the charging pulse, the charging switch connecting the voltage source to the reader plate when in the closed state, the charging switch otherwise disconnecting the voltage source from the reader plate, a discharging switch having an open state and a closed state, the discharging switch moving from its open to its closed state responsive to the discharging pulse, the discharging switch connecting the reader plate to a charge measurement means when in its closed state, the discharging switch otherwise not connecting the plate to the charge measurement means, whereby a quantity of charge representative of an apparent capacitance between the reader plate and ground is transferred to the charge measurement means, and receiver means receiving signals coupled to the reader plate; and wherein the escort apparatus comprises a first escort plate electrically coupled to a bearer and through the bearer to the electrical ground, a second escort plate electrically coupled to the reader plate, and signal generating means generating the electric signals coupled to the reader plate, the signal generating means electrically connected to the second escort plate, the signal generating means generating a sequence of voltages representative of the stored datum.

2. The system of claim 1 wherein the apparent capacitance exceeds a predetermined value when the bearer is within a detection range of the reader plate, the apparent capacitance otherwise not exceeding the predetermined value.

3. The system of claim 2 wherein the source of DC voltage comprises a battery, the battery the sole source of electric power to the reader apparatus.

4. The system of claim 2 wherein the reader apparatus is borne by a second bearer electrically coupled to the ground.

5. The system of claim 1 wherein the reader apparatus further comprises second signal generating means connected to the reader plate, the second signal generating means generating second electrical signals coupled to the second escort plate and stored in the escort apparatus.

6. The system of claim 5 wherein the sequence of electrical voltages generated in the escort apparatus comprise a first code and wherein the second electrical signals generated in the reader comprise a second code different from the first code.

7. The system of claim 1 wherein the pulse generating means generates a plurality of the charging and the discharging pulses, and wherein the escort apparatus comprises a charge storage capacitor connected to the second escort plate, the charge storage capacitor storing charge responsive to the plurality of the charging and the discharging pulses, the signal generating means of the escort apparatus powered by the charge so stored.

8. The system of claim 7 wherein the plurality of the charging and the discharging pulses comprises a periodic sequence thereof, and wherein the signals coupled to the reader plate are synchronized with the sequence.

9. The system of claim 1 wherein the bearer is a human and the datum comprises a personal identity record of the bearer.

10. The system of claim 1 wherein the reader apparatus further comprises a microprocessor operating under control of a program stored in a memory operatively connected thereto, the microprocessor controlling the pulse generating means; wherein the charging switch and the discharging switch comprise transistors, and wherein the charge measurement means comprises a charge detecting capacitor electrically connected to an analog to digital converter, the analog to digital converter supplying to the microprocessor a value representative of a voltage on the charge detecting capacitor.

11. The system of claim 1 wherein the bearer is human and wherein the first escort plate has a toroidal shape and is coupled to the electrical ground through a finger of the bearer.

12. The system of claim 1 wherein the first plate is separated from the bearer by a thin dielectric film laminated thereto, and wherein the second plate is spaced apart from the first plate by a distance greater than a thickness of the thin dielectric film.

13. The system of claim 1 wherein the signal generating means comprises an oscillator.

14. The system of claim 13 wherein the sequence of voltages representative of the stored data comprise a phase-shift keyed modulation of an output of the oscillator.

15. The system of claim 13 wherein the sequence of voltages representative of the stored data comprise a frequency-shift keyed modulation of an output of the oscillator.

16. The system of claim 2 wherein the source of DC voltage comprises a battery, wherein the reader apparatus further comprises a switch closed by the escort apparatus when the escort apparatus is proximate the reader, and wherein the pulse generating means acts responsive to the closure of the switch to generate the charging and the discharging pulses.

17. A system controlled by a datum stored in an escort apparatus, the system comprising a reader apparatus electrically coupled to an electrical ground, wherein:

the reader comprises means supplying an alternating electric voltage to a reader plate during a predetermined interval, and signal receiving means receiving signals electrically coupled to the reader plate; and wherein the escort apparatus comprises a communication plate capacitively coupled to the reader plate, a bearer plate electrically coupled to a bearer of the escort apparatus, the bearer electrically coupled to the ground, charging means coupled to the communication plate, the charging means charging an energy storage capacitor to a predetermined dc voltage responsive to the alternating electric voltage, and signaling means electrically powered by the energy storage capacitor subsequent to the predetermined interval to provide a signal representative of the datum to the signal receiving means.

18. The system of claim 17 wherein the escort apparatus further comprises a microprocessor powered by the energy storage capacitor, the microprocessor having a non-volatile memory operatively connected thereto, the datum stored in the non-volatile memory.

19. The system of claim 18 wherein the reader apparatus further comprises reader signal transmitting means operatively connected to the reader plate and wherein the escort apparatus further comprises signal receiving means operatively connected to the communication plate.

20. The system of claim 17 wherein the datum comprises an identity datum associated with the bearer.

21. The system of claim 17 wherein the signaling means comprises an oscillator.

22. The system of claim 21 wherein the signaling means comprise means producing a phase-shift keyed modulation on an output of the oscillator.

23. The system of claim 21 wherein the signaling means comprise means producing a frequency-shift keyed modulation on an output of the oscillator.

24. The system of claim 17 wherein the bearer is human, wherein the bearer plate has a toroidal shape and wherein the bearer plate is coupled to the electrical ground through a finger of the bearer.

25. The system of claim 17 wherein the bearer plate is separated from the bearer by a thin dielectric film laminated thereto, and wherein the communication plate is spaced apart from the bearer plate by a distance greater than a thickness of the thin dielectric film.

26. A method of operating a reader apparatus in a system controlled by a datum stored in an escort apparatus carried by a bearer, the reader comprising an electric power supply, a capacitive sensing means measuring a capacitance to an electrical ground of a reader plate, a time-keeping means, a pulse generating means applying a plurality of pulses to the plate, and a signal receiving means; the method comprising the steps of:

a) measuring a first value of the capacitance to the ground of the reader plate at a first time when the bearer is not proximate the reader, b) causing the reader apparatus to operate in a low energy consumption mode for a predetermined sleep interval, the interval measured by the time-keeping means;

c) causing, at the conclusion of the sleep interval, the reader apparatus to measure a second value of the capacitance to the ground of the reader plate;

d) comparing the first and second capacitance values and repeating step b) if the first and second values differ by less than a predetermined amount, and otherwise e) applying a plurality of the pulses to the reader plate;

f) waiting for a predetermined interrogation interval for a signal from the escort apparatus and, if the signal is received;

g) reading, with the signal receiving means, the control datum from the escort apparatus.

27. The method of claim 26 wherein the reader further comprises signal transmitting means, the method further comprising a step h), after step g) of: h) using the signal transmitting means to transmit a second datum to the escort apparatus.

28. The method of claim 26 further comprising a step h) after step g) of h) applying a second plurality of pulses to the reader plate.

29. The method of claim 26 further comprising a step h) after step g) of h) providing a control output to a control system.

30. The method of claim 26 wherein after step g) the method loops back to step b).

31. In a system comprising an escort apparatus having a control datum stored therein, the escort apparatus carried by a bearer, and a reader apparatus receiving the datum from the escort apparatus when the escort apparatus is within a communication range thereof, the reader apparatus having a control output, an improvement comprising:

sensing means disposed within the reader, the sensing means measuring the capacitance between a reader plate and an electrical ground, the measured capacitance exceeding a predetermined value when the bearer is within a detection range of the reader plate, the measured capacitance otherwise not exceeding the predetermined value, the sensing means having a proximity output when the measured capacitance has the first value;

first communication means disposed within the reader, the first communication means having an interrogation output responsive to the proximity output;

second communication means disposed within the escort apparatus, the second communication means responsive to the interrogation output, the second communication means communicating the datum to the first communication means if the escort apparatus is within the communication range.

32. The system of claim 31 wherein the escort apparatus comprises a microprocessor controlling the second communication means, and wherein the datum is stored in a non-volatile memory operatively connected to the microprocessor.

33. The system of claim 31 wherein the bearer is human and wherein the second communication apparatus comprises a first escort plate having a toroidal shape, the first escort plate coupled to the reader plate, the second communication apparatus further comprising a second escort plate electrically coupled to an electrical ground through a finger of the bearer.

34. The system of claim 31 wherein the second communication apparatus comprises a first escort plate and a second escort plate, the first escort plate separated from the bearer by a thin dielectric film laminated thereto, the second escort plate spaced apart from the first plate by a distance greater than a thickness of the thin dielectric film.

35. The system of claim 31 wherein the bearer is a human and wherein the datum comprises a personal identity datum.

36. The system of claim 31 wherein the reader apparatus is powered by a battery, the reader apparatus further comprising energy saving means disabling the sensing means for a first fraction of a duty cycle, the energy saving means enabling the sensing means for the balance of the duty cycle.

37. The system of claim 31 wherein the sensing means further comprises a source of dc voltage, a pulse generating means generating a charging pulse and a subsequent discharging pulse, a charging switch having an open state and a closed state, the charging switch moving from its open to its closed state responsive to the charging pulse, the charging switch connecting the voltage source to the reader plate when in the closed state, the charging switch otherwise disconnecting the voltage source from the reader plate, and a discharging switch having an open state and a closed state, the discharging switch moving from its open to its closed state responsive to the discharging pulse, the discharging switch connecting the reader plate to a charge measurement means when in its closed state, the discharging switch otherwise not connecting the plate to the charge measurement means, whereby a quantity of charge representative of an apparent capacitance between the reader plate and ground is transferred to the charge measurement means.

38. A system comprising a reader electrically coupled to an electrical ground and an escort apparatus borne by a bearer electrically coupled to the ground, wherein the reader comprises a reader plate, a source of dc voltage, a reader microprocessor operating under control of a first stored program stored in a first memory, a pulse generating means controlled by the reader microprocessor to generate a charging pulse and a subsequent discharging pulse, a charging switch having an open state and a closed state, the charging switch moving from its open to its closed state responsive to the charging pulse, the charging switch connecting the voltage source to the reader plate when in the closed state, the charging switch otherwise disconnecting the voltage source from the reader plate, a discharging switch having an open state and a closed state, the discharging switch moving from its open to its closed state responsive to the discharging pulse, the discharging switch connecting the reader plate to a charge measurement means when in its closed state, the discharging switch otherwise not connecting the plate to the charge measurement means, whereby a quantity of charge representative of an apparent capacitance between the reader plate and ground is transferred to the charge measurement means, and receiver means receiving signals coupled to the reader plate;

and wherein the escort apparatus comprises bearer plate capacitively coupled to the bearer, a communication plate capacitively coupled to the reader plate, an escort microprocessor operating under control of a second stored program, a non-volatile memory storing a datum, and communication means connected to the communication plate and operating under control of the escort microprocessor to generate a coded representation of the stored datum, whereby the coded representative of the stored datum is received by the receiver circuit.

39. The system of claim 38 further comprising a second datum stored in a memory means operatively connected to the reader microprocessor, wherein the reader microprocessor controls the pulse generating means to generate a sequence of pulses comprising a second coded representation of the second datum, and wherein the communication means in the escort apparatus comprises receiving means receiving the second coded representation.

40. The system of claim 39 wherein the first datum comprises an identity datum associated with the bearer.

41. The system of claim 39 wherein the communication means comprises an oscillator and wherein the first coded representation comprises a phase-shift keyed modulation of an output of the oscillator.

42. The system of claim 39 wherein the communication means comprises an oscillator and wherein the first coded representation comprises a frequency-shift keyed modulation of an output of the oscillator.

43. The system of claim 38 wherein the source of dc voltage comprises a battery providing the only source of power to the reader apparatus.

44. The system of claim 43 further comprising a predetermined value stored in the first memory, the reader microprocessor comparing the predetermined value with the quantity of charge representative of an apparent capacitance, the quantity of charge exceeding the predetermined value when the bearer is within a detection range of the reader plate, the quantity of charge otherwise not exceeding the predetermined value, the reader microprocessor controlling the pulse generating means to generate pulses at a first rate when the bearer is within the detection range, the reader microprocessor otherwise controlling the pulse generating means to generate pulses at a second, lower, rate.

45. The system of claim 43 wherein the reader apparatus further comprises switch means having a closed state when the escort apparatus is inserted thereinto, the switch means otherwise having an open state.

* * * * *